(12) United States Patent
Morikawa

(10) Patent No.: US 6,171,629 B1
(45) Date of Patent: *Jan. 9, 2001

(54) METHODS AND APPARATUS FOR JOINING DOUGH BLOCKS

(75) Inventor: Michio Morikawa, Utsunomiya (JP)

(73) Assignee: Rheon Automatic Machinery Co., Ltd. (JP)

( * ) Notice: Under 35 U.S.C. 154(b), the term of this patent shall be extended for 0 days.

This patent is subject to a terminal disclaimer.

(21) Appl. No.: 08/779,178

(22) Filed: Jan. 6, 1997

(30) Foreign Application Priority Data

Jan. 9, 1996 (JP) .................................... 8-019440

(51) Int. Cl.$^7$ .............................. A21D 6/00; A21C 3/02; B29C 55/18
(52) U.S. Cl. ..................... 426/502; 426/231; 426/517; 426/496; 425/141; 425/230; 425/145; 425/239; 425/367; 425/371; 425/517; 425/140; 425/363; 425/372; 100/47; 100/163 R; 100/161; 100/168; 100/169; 100/170; 100/176
(58) Field of Search ................... 426/502, 231, 426/517, 496; 425/141, 230, 145, 239, 367, 371, 517, 140, 363, 372; 100/47, 163 R, 161, 168, 169, 170, 176

(56) References Cited

U.S. PATENT DOCUMENTS

| | | |
|---|---|---|
| 3,553,775 | 1/1971 | Decker . |
| 4,276,317 | 6/1981 | Hayashi . |
| 4,338,341 | 7/1982 | Glass . |
| 4,375,349 | 3/1983 | Vrbanek . |
| 4,869,661 | 9/1989 | Nogueroles ........................ 425/230 |
| 4,904,491 | 2/1990 | Morikawa et al. .................. 426/502 |
| 4,946,699 | 8/1990 | Kageyama et al. . |
| 5,091,202 | 2/1992 | Hayashi . |
| 5,110,277 * | 5/1992 | Hayashi . |
| 5,124,163 * | 6/1992 | Hayashi . |
| 5,204,123 | 4/1993 | Hayashi . |
| 5,225,209 | 7/1993 | Hayashi . |
| 5,232,713 * | 8/1993 | Morikawa . |
| 5,266,341 | 11/1993 | Morikawa et al. .................. 426/231 |
| 5,498,148 | 3/1996 | Quellette et al. . |
| 5,505,970 | 4/1996 | Morikawa ......................... 426/231 |
| 5,733,589 * | 3/1998 | Oki .................................. 425/364 R |
| 5,888,573 | 3/1999 | Hayashi . |

FOREIGN PATENT DOCUMENTS

| | | |
|---|---|---|
| 687310 | 1/1997 | (AU) . |
| 4424461 * | 3/1995 | (DE) . |
| 0 140458 | 10/1984 | (EP) . |
| 0 311 240 | 8/1988 | (EP) . |
| 0 453 248 | 4/1991 | (EP) . |
| 0 251 138 B1 | 3/1992 | (EP) . |
| 0 326 404 B1 | 1/1994 | (EP) . |
| 0 657 101 A1 | 6/1995 | (EP) . |
| 0 545 725 B1 | 11/1995 | (EP) . |
| 0744126A1 | 11/1996 | (EP) . |
| 0744126 A1 * | 11/1996 | (EP) .............................. A21C/3/02 |
| 61-6782 | 2/1986 | (JP) . |
| 20201723 * | 5/1991 | (RU) . |

\* cited by examiner

Primary Examiner—Phuong T. Bui
(74) Attorney, Agent, or Firm—Brinks Hofer Gilson & Lione

(57) ABSTRACT

An apparatus for joining dough blocks to form a continuous dough sheet. The dough blocks are cut from a dough mass and drop into a space between first and second groups of rollers. The first and second groups of rollers include horizontally-paired rollers arranged in tiers and forming a substantially V-shaped space for receiving the dough blocks, with the uppermost pair of rollers being separated by a first horizontal gap which is wider than a second horizontal gap separating the lowermost pair of rollers. The first group of rollers are rotated in a direction (e.g., clockwise) which is opposite to that of the second group of rollers. In addition, the first group of rollers is alternately moved toward and away from the second group of rollers, thereby applying vibrations to the dough blocks. The combined rotation and vibrations of the rollers impels the dough blocks downward toward the second gap between the lowermost pair of rollers and increases gluten growth and a joining of the gel structures to produce a continuous dough sheet.

11 Claims, 5 Drawing Sheets

METHODS AND APPARATUS FOR JOINING DOUGH BLOCKS

BACKGROUND OF INVENTION

1. Field of Invention

The present invention relates to a method and an apparatus for joining separated blocks of dough, and for supplying a continuous sheet of dough formed from the joined dough blocks. In particular, the present invention relates to a method and apparatus for joining a first kneaded dough block to a subsequently-provided kneaded dough block such that the gel structures of the dough blocks are integrally joined to form a continuous dough sheet on a production line.

2. Prior Art

In a conventional apparatus, a plurality of dough sheets are formed by pressing individual kneaded dough blocks, and then portions of each dough sheet are cut away to produce, for example, bread products. Each dough sheet has a volume corresponding to the volume of the kneaded dough block from which it was formed. The entire dough sheet is used in one production lot, or each part of the dough sheet is used in a production lot. When one dough sheet is used in a production lot, production time is lost between the adjacent dough sheets when they are fed by a conveyor. Also, fragments which remain after portions of the dough sheet are cut away are not used during production.

In a conventional apparatus, if necessary, adjacent dough sheets are joined to each other by a manual operation. That is, a rear end of a dough sheet is piled on a front end of a subsequently-formed dough sheet, and then the piled ends are manually pressed such that they adhere to each other. There is no apparatus to perform this sheet joining operation. Thus, the operation must be manually performed whenever a gap appears between sequentially-formed dough sheets, so that a significant amount of manual labor is needed to perform the joining operation. In bread production lines, unmanned production is usually performed to make bread from dough sheets that have the same conditions in their degree of composition and kneading, because technology to make a thin dough sheet has been improved and is now broadly used. However, when many kinds of breads that have several shapes and additional ingredients, such as fillings, are made on the same production line, much manual work is needed to join sequentially-formed dough sheets.

A gel structure is formed in a dough mass during a mixing operation. When the dough mass is cut to form individual dough blocks, the gel structure of each dough block is separated from the dough mass and from all previously-formed dough blocks. Thus, in order to join two separated dough blocks, it is necessary to join their gel structures. Currently, there is no apparatus for automatically joining the gel structures of two dough blocks.

SUMMARY OF INVENTION

An object of the present invention is to overcome the disadvantages of the prior art.

In accordance with the present invention, a method and apparatus are provided for automatically joining a first dough block to a subsequently-formed dough block, so that a very long and continuous dough sheet is automatically made, and so that unmanned production over a 24 hour period is achieved.

The present invention allows gel structures of dough blocks to be automatically joined to each other. This invention also allows several kinds of breads to be produced during a non-stop production process. In a conventional apparatus there are many production lots corresponding to the mixing operations of the dough. This invention allows a continuous dough sheet corresponding to one production lot to be made. Thus, this invention allows segmentation of douch sheets to be minimized. Also, this invention minimizes the time between the processing of subsequently-formed dough sheets.

One object of the present invention is to provide a method and apparatus for joining dough blocks to each other. The apparatus comprises horizontally and oppositely-positioned pairs of rollers provided in a plurality of tiers. The rollers are arranged such that the distances between the roller pairs in the upper tiers are sequentially greater than the distances between the roller pairs in the lower tiers, thereby forming a "V" shaped space for receiving the dough blocks. Each pair of rollers is rotated in an opposite direction such that a surface of each roller facing the "V" shaped space pushes the dough blocks downward. In addition, the distances between the roller pairs are alternately increased and decreased, thereby causing a pressure applied to the dough blocks by the rollers to alternately increase and decrease to produce a vibrations in the dough blocks as the dough blocks are impelled downward. The resulting thixotropic effect in the dough produced by these vibrations accelerates the growth of gluten and the joining of gel structures of the dough blocks, and a continuous belt-like dough sheet is thereby formed.

The method uses horizontally and oppositely positioned pairs of rollers provided in a plurality of tiers. The rollers are arranged such that the distances between the roller pairs of the upper tiers are sequentially greater than the distances between the roller pairs of the lower tiers, thereby forming a "V" shaped space for receiving the dough blocks. The method includes rotating the rollers of each pair in opposite directions while alternately increasing and decreasing the distances between the rollers of each pair such that a pressure applied by the rollers to the dough blocks is alternately increased and decreased, thereby impelling the dough blocks downward. The resulting vibrations in the dough produced by this pressing and releasing action accelerates the growth of gluten and the joining of gel structures of the dough blocks, and a continuous belt-like dough sheet is thereby formed from the dough blocks.

DESCRIPTION OF THE PREFERRED EMBODIMENT

Figure 1:
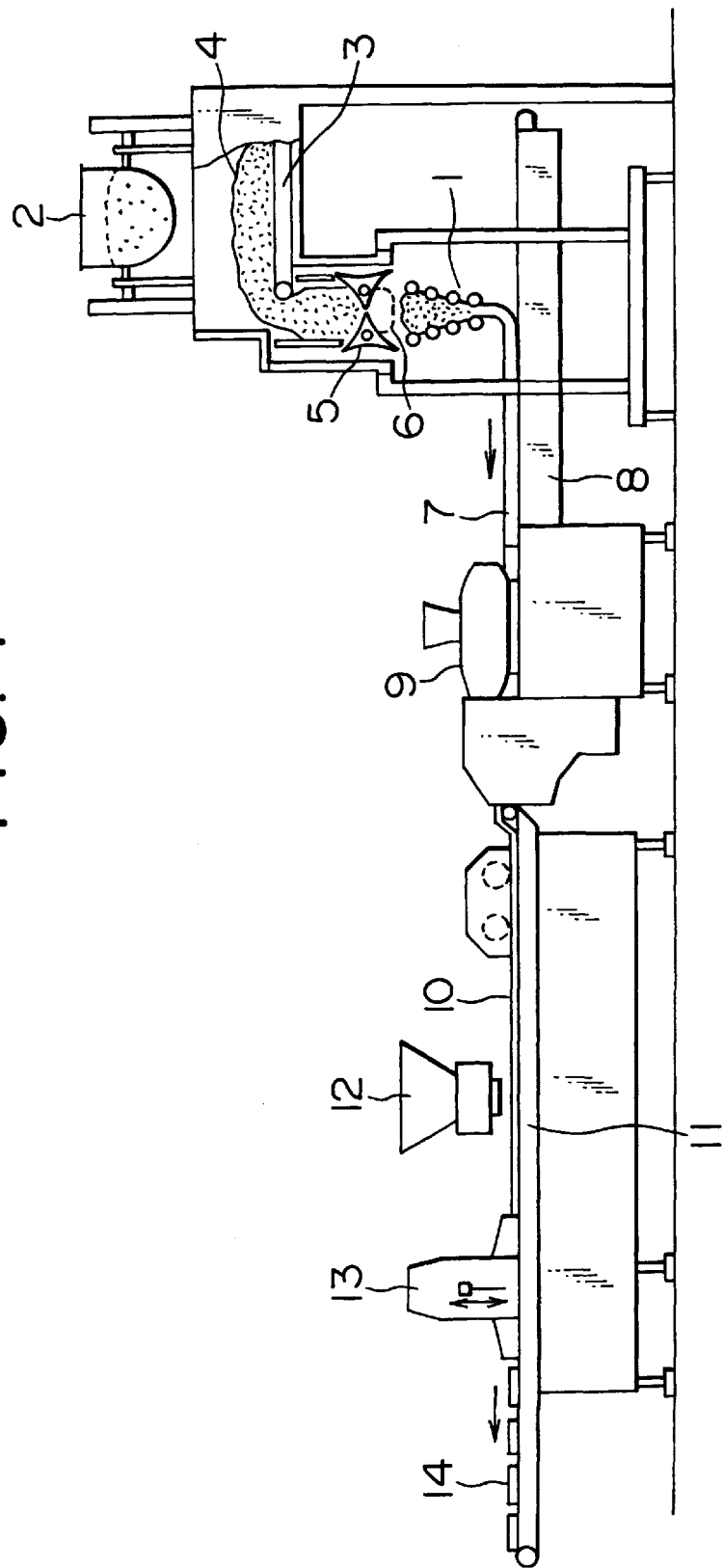
FIG. 1 is a schematic side view of a bread production apparatus that includes a first embodiment of an apparatus for joining dough blocks according to the present invention.

FIG. 1 shows a bread-making apparatus that includes an apparatus 1 for joining dough blocks in accordance with a first embodiment of the present invention. A bowl 2 mixes and kneads materials to make a dough mass 4. The dough mass 4 is supplied from the bowl 2 onto a conveyor or a dough feeder 3. The dough feeder 3 feeds the dough mass 4 to a set of rotatable cutter blades 5, which separates dough blocks 6 from the dough mass 4. The dough blocks 6 are then supplied to the joining apparatus 1 in response to signals from a sensor 21 (shown in FIG. 2 and discussed below). The joining apparatus 1 joins dough blocks to each other to provide a continuous belt-like dough sheet 7 which is deposited from a lower opening of the joining apparatus 1 onto a first conveyor 8. The dough sheet is continuous (i.e., not separated by gaps). The first conveyor 8 feeds the dough sheet 7 to a dough-extending apparatus 9. The extending apparatus 9 presses and extends the dough sheet 7 to make a pressed dough sheet 10 having a predetermined thickness and width required for making desired bread products. The dough-extending apparatus 9 feeds the pressed dough sheet 10 to a second conveyor 11. A depositing apparatus 12 is located above the second conveyor 11 so as to supply a filling, such as jam or meat, onto the pressed dough sheet 10. A cutting apparatus 13 is positioned over the second conveyor 11. The cutting apparatus 13 moves vertically to cut the pressed dough sheet 10 into pieces 14, each piece 14 having a desired length and width. Also, the cutting apparatus 13 may provide desired shapes to the pieces 14. Then resulting dough pieces 14 are continuously output from the cutting apparatus 13.

Figure 2:
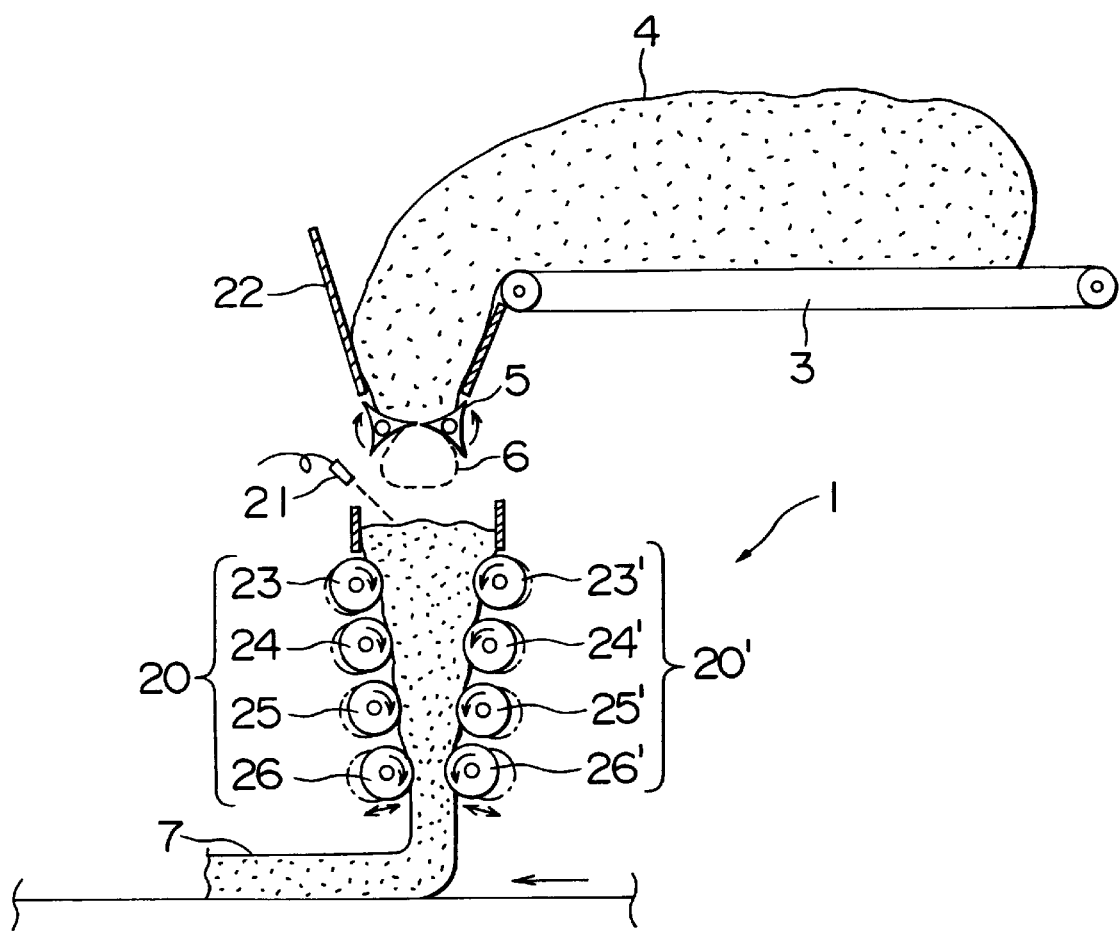
FIG. 2 is an enlarged schematic side view of the apparatus shown in FIG. 1.

FIG. 2 is an enlarged view of a part of the bread-making apparatus shown in FIG. 1. A hopper 22 is positioned at the forward end of the dough feeder 3.

The rotatable cutter blades 5 are positioned at a bottom opening of the hopper 22. The joining apparatus 1 is located under the opening of the hopper 22 and the rotatable cutter blades 5. A sensor 21 is positioned near an upper opening of the joining apparatus 1, and senses whether an amount of dough in the joining apparatus 1 decreases to such an extent that the upper surface of the dough is below a predetermined level in the joining apparatus 1. When the sensor 21 senses the surface of the dough in the joining apparatus 1 is below a predetermined level, it outputs a signal. In response to this signal, the dough feeder 3 is driven to feed the dough mass 4 into the hopper 22. Simultaneously, the dough cutter blades 5 are rotated. When the dough mass 4 is supplied from the dough feeder 3 to the hopper 22, a dough block 6 is cut from the dough mass 4 by the blades 5, which are located at the bottom opening of the hopper 22, thereby causing the dough block 6 to have a predetermined volume. The cut dough block 6 drops into the upper opening of the joining apparatus 1. As a result, the amount of dough in the joining apparatus 1 is increased such that an upper surface of the dough is above the predetermined level.

The joining apparatus 1 includes a first roller group 20 including rollers 23, 24, 25 and 26, and a second roller group 20' including rollers 23', 24', 25' and 26'. In the embodiment shown in FIG. 2, each roller of the first and second groups 20 and 20' is cylindrical, and is shown in end-view in FIG. 2. The rollers 23–26 are parallel and aligned in a first row, and the rollers 23'–26' are also parallel and aligned in a second row. The first and second rows of rollers are arranged to form a "V" shaped space for receiving the dough blocks 6 cut by the blades 5. Each roller of the first group is arranged opposite to a corresponding roller of the second group in a horizontal plane or tier. For example, rollers 23 and 23' are arranged in an uppermost tier and are separated by a first horizontal gap forming the upper opening of the joining apparatus 1. Likewise, rollers 26 and 26' are arranged in a lowermost tier and are separated by a second horizontal gap forming the lower opening of the joining apparatus 1. The first horizontal gap is greater than the second horizontal gap. The remaining opposing roller pairs (that is, 24 and 24', and 25 and 25') in the respective intermediate tiers are spaced apart to form the "V" shaped space. In addition, the rollers of the first group 20 are rotated in an opposite direction from the rollers of the second group 20' by a suitable driving means (not shown) such that the dough blocks therebetween are pushed downward. For example, as indicated in FIG. 2, the rollers of the first group 20 are rotated clockwise, while the corresponding rollers of the second group are rotated counter-clockwise. In addition to rotating, each roller reciprocally swings or linearly moves toward and away from its opposing roller. Thus, the rollers in an opposite roller pair are alternately moved toward and away from each other in a horizontal plane, so that the gaps between them are repeatedly increased and decreased. When the opposing rollers move toward each other, pressure on the dough therebetween is increased. When the opposing rollers move away from each other, the pressure is decreased. The rate of movement of the opposing rollers is selected such that the repeated increase and decrease in pressure applied to the dough produces vibrations which create a thixotropic effect in the dough. As a result, the gluten in the dough increases and the gel structures of the dough blocks are joined to each other.

The circumferential speeds of the lower rollers of the groups are lower than those of the upper rollers of the groups. However, the circumferential speeds of all of the rollers may be the same. Also, the speeds of the rollers of one group may differ from those of the rollers of the other group.

Figure 3:
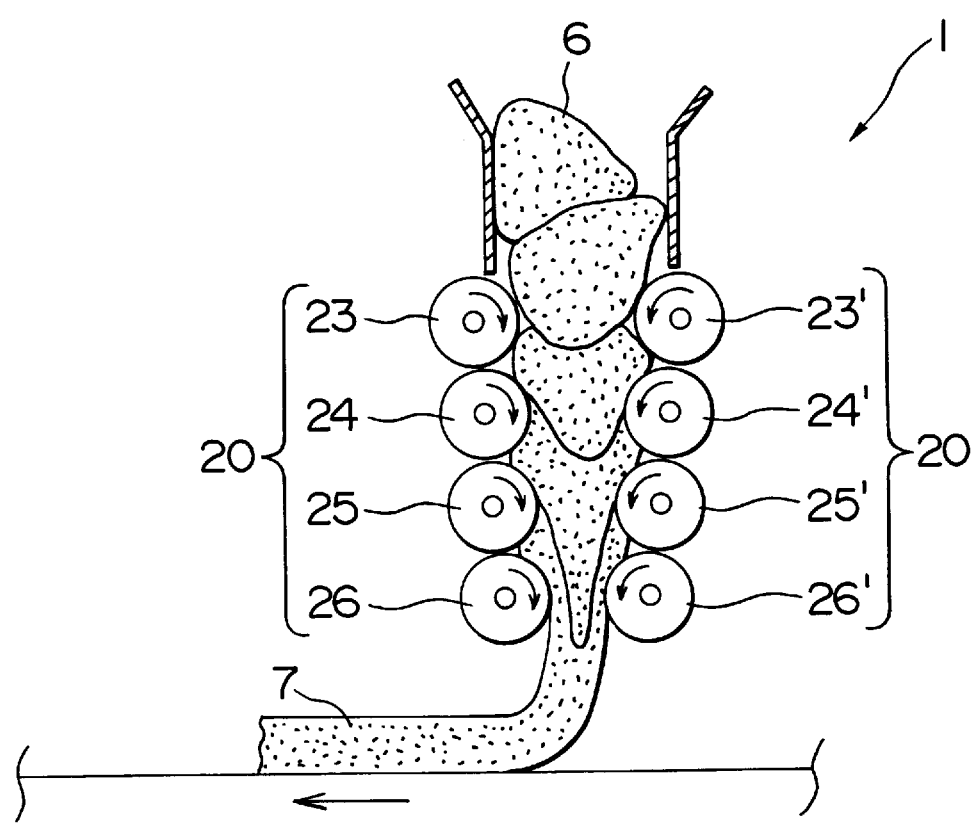
FIG. 3 is a schematic side view for explaining operation steps of the apparatus shown in FIG. 2.

FIG. 3 shows the joining apparatus 1, in which the circumferential speeds of the lower rollers of the groups are lower than those of the upper rollers. For example, the speeds of the rollers 25, 25', and 26, 26' are lower than those of the rollers 23, 23' and 24, 24'. Parts of the surfaces of each dough block 6 that contact the upper rollers 23, 23', and 24, 24' are drawn downward as the rollers rotate. Then, these parts and/or other parts of the surface of each dough block 6 that contact the lower rollers 25, 25', and 26, 26' are drawn to the lower opening of the joining apparatus 1. Thus, the parts of the dough block 6 that contact the upper rollers flow faster than those that contact the lower rollers.

However, parts of each dough block 6 located in the middle of the "V" shaped space between the opposite roller pairs (that is, parts which do not contact any roller) flow faster than the parts that contact the rollers. This occurs because the pressure applied by the opposing roller pairs to each dough block 6 when the opposing rollers approach each other forces the dough blocks downward toward the lower opening, rather than the dough blocks being drawn by the rotations of the rollers 23, 23', 24, 24', 25, 25', 26, and 26'. Thus, as shown in FIG. 3, parts of each dough block 6 that do not contact the rollers and that are generally positioned at the middle between each opposing roller pairs flow faster than those that contact the rollers.

In detail, a lower surface of a dough block 6 is generally flat (horizontal) when the dough block is supplied from the hopper 22 onto the top surface of a previously-supplied dough block located in the joining apparatus 1. As the dough block is drawn downward into the joining apparatus 1, the lower surface of the dough block 6 that contacts the upper surface of the previously-supplied dough block descends at a higher rate at the mid-point between the opposing roller pairs such that the dough block becomes V-shaped. This V-shaped layer is gradually elongated as the dough block 6 descends further into the joining apparatus 1, so that the surface areas of adjacent dough blocks that contact each other are increased. Then, the layer extends longitudinally. Simultaneously, the roller pairs move toward and away from each other to press the dough block and release the pressure from the dough block, so that the contacted surfaces are vibrated by the motions of the rollers. As a result, the adhesion between the contacted surfaces of the adjacent dough blocks is increased. Also, the receding and approaching movements of the rollers function as a tapping motion on the dough blocks, resulting in generating a thixotropic effect. Thus, the flowage of the dough is increased and the joining of the gluten in the dough is accelerated. Finally, the joining apparatus 1 supplies a continuous and belt-like dough sheet 7 through the lower opening onto the first conveyor 8.

Figure 4:
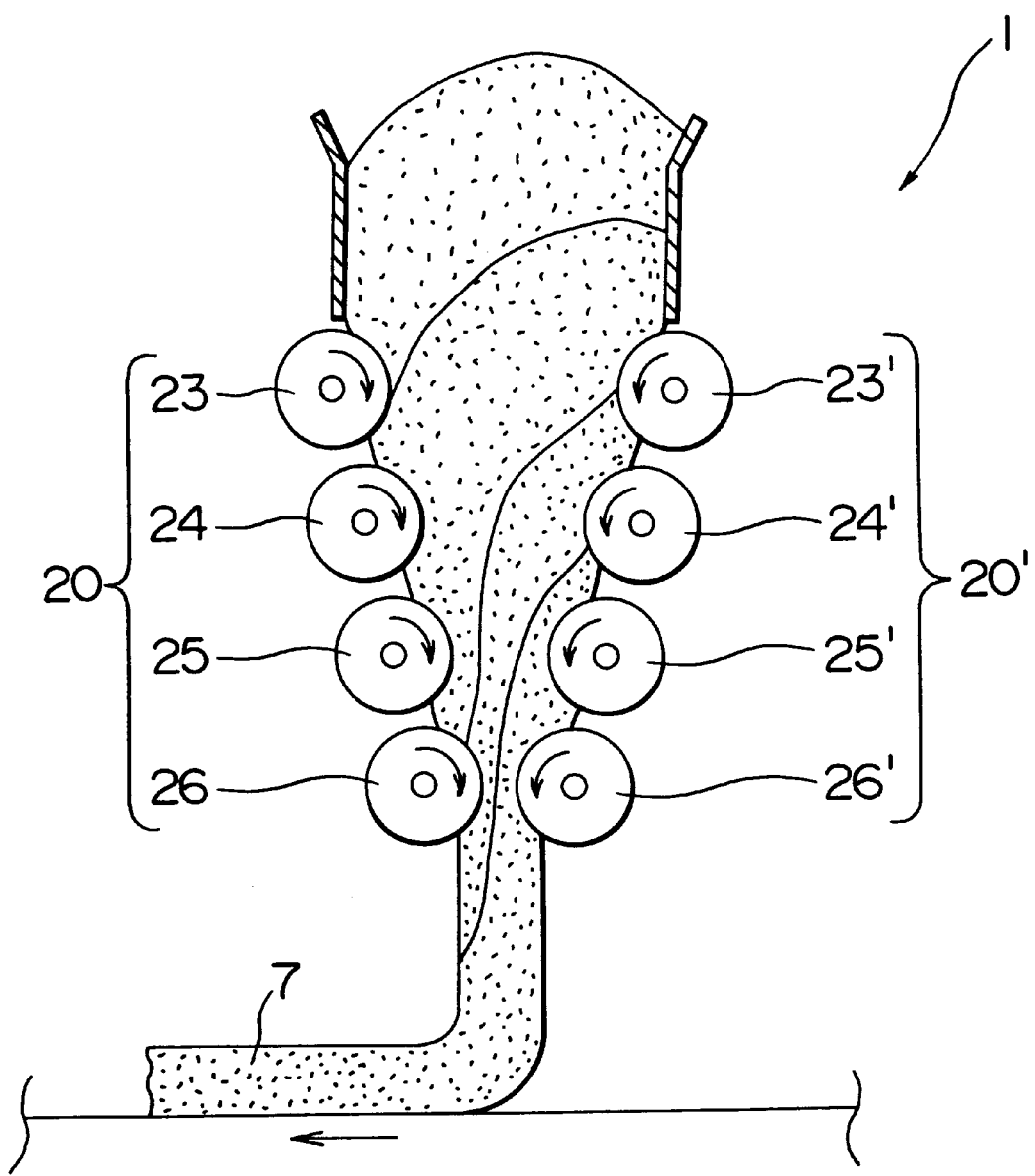
FIG. 4 is a schematic side view for explaining operation steps of the apparatus shown in FIG. 2.

FIG. 4 shows the joining apparatus 1, in which the circumferential speeds of the rollers of one group differ from those of the rollers of the other group. That is, the circumferential speeds of the rollers 23, 24, 25, and 26 of the group 20 are faster than those of the rollers 23', 24', 25', and 26' of the group 20'. As a result, as shown in this figure, the parts of each dough block 6 that contact the rollers 23, 24, 25, and 26 are drawn down faster by these rollers than the parts of each dough block 6 that contact the rollers 23', 24', 25', and 26'. Thus, each separated dough block 6 is modified to form long continuous dough layers. The movements of the rollers toward and away from each other increases adhesion between the dough layers. Then, the joining apparatus 1 supplies a continuous and belt-like dough sheet 7 to the first conveyor 8.

Figure 5:
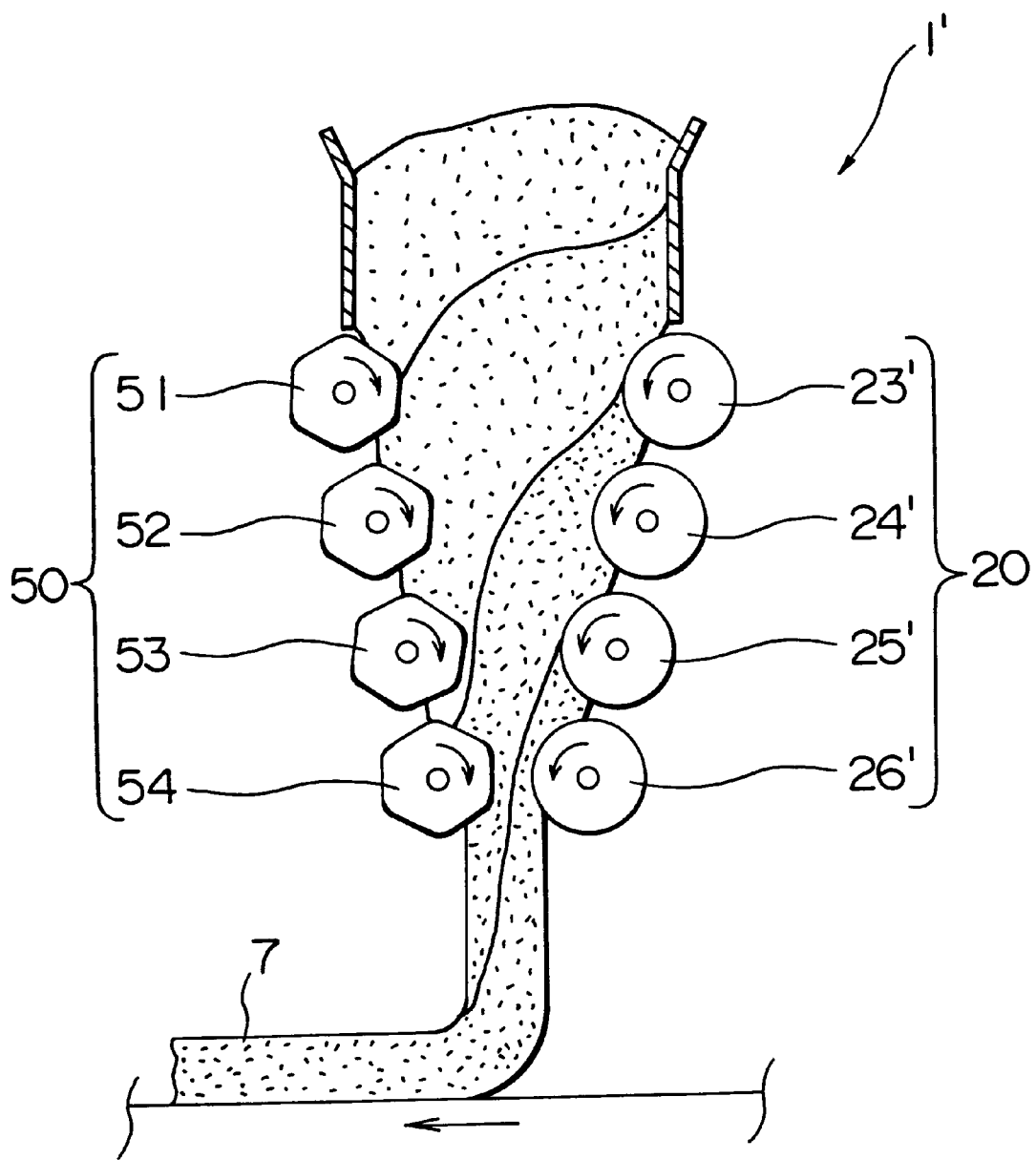
FIG. 5 is a schematic side view of a second embodiment of the apparatus for joining dough blocks according to the present invention.

FIG. 5 shows another embodiment, namely, 1', of the joining apparatus 1 as in FIG. 1. It includes a group 50 of rollers 51, 52, 53, and 54 and the group 20' of the rollers 23', 24', 25', and 26'. The cross-sectional shape of each roller of the group 50 is hexagonal. These hexagonal rollers impel the dough with a stronger force than the cylindrical rollers, so that each separated dough block 6 is modified more effectively into long continuous dough layers along the longitudinal direction of the flow of the dough. The long continuous dough layers extending in the longitudinal direction of flow of the dough have large contact surfaces. Thus, the resulting thixotropic effect unites the gel structures of the dough layers.

Polygonal rollers may be used for the sectional shape of the rollers. Also, polygonal rollers may be used for the upper rollers of the joining apparatus 1 in FIG. 1, so that the same effects as is the case as in FIG. 4 can be generated.

In the above embodiments, either or both of the group 20' of the rollers 23', 24', 25', and 26' and the group 20 of the rollers 23, 24, 25, and 26 or either or both of the group 20' of the rollers 23', 24', 25', and 26' and the group 50 of rollers 51, 52, 53, and 54 is/are reciprocally swung or linearly and reciprocally moved. However, this invention is not limited to these configurations. For example, the distances between the opposite roller pairs may be changed so that their pressing movements are sequentially generated between them from above downwards. Also, the distances between the opposite roller pairs may be alternately changed in the vertical direction such that the pressing movements between the opposite roller pairs are alternately effected in the vertical direction.

By this invention gel structures in respective dough blocks are joined to each other by repeatedly providing pressing and vibrating operations to the dough blocks, so that the dough blocks are deformed and piled upon each other to form layers. Thus, a continuous belt-like dough web is formed.

What is claimed is:

1. An apparatus for joining a plurality of dough blocks to form a continuous dough sheet, the apparatus comprising a plurality of rollers including a first group of rollers and a second group of rollers, the first group of rollers including a first uppermost roller and a first lowermost roller, the second group including a second uppermost roller and a second lowermost roller, the first and second uppermost rollers being located in a first horizontal tier and being separated by a first horizontal gap, the first and second lowermost rollers being located in a second horizontal tier and being separated by a second horizontal gap, the first horizontal gap being greater than the second horizontal gap, wherein the first group of rollers are rotated in a direction opposite to the second group of rollers such that the dough blocks are impelled downward toward the second horizontal gap, and means for moving at least one of the first group of rollers and the second group of rollers alternately toward and away from each other while the first and second groups of rollers are rotated such that the first horizontal gap and the second horizontal gap are repeatedly increased and decreased, thereby alternately increasing and decreasing a pressure applied to the dough blocks passing therebetween such that the gel structures of the plurality of dough blocks passing between the first and second lowermost rollers are integrated to form the continuous dough sheet.

2. The apparatus according to claim 1, wherein a rotating speed of the first and second lowermost rollers is equal to or less than a rotating speed of the first and second uppermost rollers.

3. The apparatus according to claim 1, wherein a rotating speed of the first uppermost roller is greater than a rotating speed of the second uppermost roller, and a rotating speed of the first lowermost roller is greater than a rotating speed of the second lowermost roller.

4. The apparatus according to claim 1, wherein at least one of the plurality of rollers has a circular sectional shape.

5. The apparatus according to claim 1, wherein at least one of the plurality of rollers has a polygonal sectional shape.

6. The apparatus according to claim 1, wherein at least one of the plurality of rollers has a circular sectional shape, and at least one of the plurality of rollers has a polygonal sectional shape.

7. The apparatus according to claim 1, further comprising means for cutting portions of a dough mass to form the plurality of dough blocks, the cutting means being positioned over the first horizontal gap such that the dough blocks drop from the cutting means into a space located between the first and second groups of rollers.

8. The apparatus according to claim 7, further comprising a sensor for detecting an amount of dough located between the first and second groups of rollers, and for controlling the cutting means to cut a dough block from the dough mass when the detected amount of dough is less than a predetermined amount.

9. A method for joining a plurality of dough blocks to form a continuous dough sheet, the method comprising the steps of:

causing the plurality of dough blocks to successively drop between a plurality of rollers including a first group of rollers and a second group of rollers, the first group of rollers including a first uppermost roller and a first lowermost roller, the second group including a second uppermost roller and a second lowermost roller, wherein a first horizontal gap separating the first and second uppermost rollers is greater than a second horizontal gap separating the first and second lowermost rollers;

rotating the first group of rollers in a first direction while rotating the second group of rollers in a second direction which is opposite to the first direction;

alternately moving the first group of rollers toward and away from the second group of rollers such that the first horizontal gap and the second horizontal gap are repeatedly increased and decreased, thereby alternately increasing and decreasing a pressure applied to the dough blocks passing therebetween such that the gel structures of the plurality of dough blocks passing between the first and second lowermost rollers are integrated to form the continuous dough sheet.

10. An apparatus for joining a plurality of dough blocks to form a continuous dough sheet, the apparatus comprising a plurality of rollers including a first group of rollers and a second group of rollers, the first group of rollers including a first uppermost roller and a first lowermost roller, the second group including a second uppermost roller and a second lowermost roller, the first and second uppermost rollers being located in a first horizontal tier and being separated by a first horizontal gap, the first and second lowermost rollers being located in a second horizontal tier and being separated by a second horizontal gap, the first horizontal gap being greater than the second horizontal gap, wherein the first group of rollers are rotated in a direction opposite to the second group of rollers such that the dough blocks are impelled downward toward the second horizontal gap, and means for moving the first group of rollers alternately toward and away from the second group of rollers while the first and second groups of rollers are rotated such that the first horizontal gap and the second horizontal gap are repeatedly increased and decreased, thereby alternately increasing and decreasing a pressure applied to the dough blocks passing therebetween such that the gel structures of the plurality of dough blocks passing between the first and second lowermost rollers are integrated to form the continuous dough sheet.

11. The apparatus of claim 10, wherein both the first group of rollers and the second group of rollers are alternately moved toward and away from each other.

* * * * *